United States Patent
Miller et al.

(10) Patent No.: US 6,580,050 B1
(45) Date of Patent: Jun. 17, 2003

(54) SOLDERING STATION WITH BUILT-IN SELF-CALIBRATION FUNCTION

(75) Inventors: Thomas W. Miller, Eldersburg, MD (US); Charles H. McDavid, Nottingham, MD (US); Paul Alan Dunham, Willen Village (GB); William Jordan Siegel, Bethesda, MD (US); Eric Stephen Siegel, Rockville, MD (US)

(73) Assignee: Pace, Incorporated, Annapolis Junction, MD (US)

( * ) Notice: Subject to any disclaimer, the term of this patent is extended or adjusted under 35 U.S.C. 154(b) by 0 days.

(21) Appl. No.: 10/046,545

(22) Filed: Jan. 16, 2002

(51) Int. Cl.[7] .............................. B23K 3/04; B23K 3/02; B23K 3/03; H05B 3/42
(52) U.S. Cl. .................... 219/85.16; 219/241; 219/229; 219/238; 228/55; 228/9
(58) Field of Search ................................. 219/241, 229, 219/238, 239, 240, 85.16, 452, 487, 494, 507, 520, 538; 228/9, 51, 55, 56.5

(56) References Cited

U.S. PATENT DOCUMENTS

| | | | | |
|---|---|---|---|---|
| 3,646,577 A | * | 2/1972 | Ernst ........................... 219/241 |
| 3,883,716 A | * | 5/1975 | Fortune ........................ 219/241 |
| 3,919,524 A | * | 11/1975 | Fortune ........................ 219/238 |
| 4,673,300 A | * | 6/1987 | Wilhelmson et al. ........ 374/182 |
| 4,839,501 A | | 6/1989 | Cowell |
| 4,891,497 A | * | 1/1990 | Yoshimura ................... 219/241 |
| 5,014,210 A | * | 5/1991 | Postlewait et al. ........... 700/207 |
| 5,043,560 A | | 8/1991 | Masreliez |
| 5,120,936 A | * | 6/1992 | Shyu et al. .................. 219/497 |
| 5,151,574 A | * | 9/1992 | Urban .......................... 219/241 |
| 5,397,874 A | * | 3/1995 | Griffith ........................ 219/497 |
| 5,495,093 A | | 2/1996 | Griffith |
| 5,698,774 A | * | 12/1997 | Osmanski ................... 73/61.43 |
| 6,492,626 B1 | * | 12/2002 | Sedlak et al. ............... 219/497 |

* cited by examiner

Primary Examiner—Tom Dunn
Assistant Examiner—Colleen P. Cooke
(74) Attorney, Agent, or Firm—Nixon Peabody LLP; David S. Safran

(57) ABSTRACT

A soldering station with a control unit and a soldering iron having a replaceable soldering tip, the soldering iron being connected to the control unit by a power cord for receiving electrical power from said control unit is provided with an automatic calibration feature. The control unit has circuitry for controlling the temperature of the soldering iron at the tip by adjusting the supply of power to the tip heater of the soldering iron, a temperature selector for enabling selection of a temperature to which the soldering iron is to be heated by a user, a calibration temperature sensor connected to said circuitry and exposed for enabling it to be engaged by the tip of the soldering iron. The circuitry has a calibration mode and a heating mode, and in said calibration mode, the circuitry is compares a temperature sensed by the calibration temperature sensor and produced by contacting of the soldering iron which has been heated to a temperature selected with said temperature selector with the calibration temperature sensor, and adjusts the power supply to the tip heater so as to bring the temperature sensed by the calibration temperature sensor into conformance with the temperature selected with the temperature selector.

11 Claims, 3 Drawing Sheets

SOLDERING STATION WITH BUILT-IN SELF-CALIBRATION FUNCTION

BACKGROUND OF THE INVENTION

1. Field of the Invention

This invention relates generally to soldering irons and soldering stations used in modern electronic production, rework and repair applications which are temperature controlled, but primarily relates to those with closed-loop temperature control for which a defined level of temperature accuracy is desirable, or which are, in certain circumstances, required to be calibrated periodically for the purpose of confirming or re-establishing compliance with various performance standards which include, among other things, proper tip grounding, EMF leakage, temperature stability and a defined level of absolute temperature accuracy between the temperature set or indicated on a control/display device (typically a dial or digital readout) and the actual temperature of the working end of the tip as measured by a more direct, independent means, such as an embedded or spot welded thermocouple, contact pyrometer or some other means.

2. Description of Related Art

For modern, high-reliability electronic production, rework and repair applications, closed-loop temperature controlled soldering irons and stations (hereinafter, "soldering stations" shall also include "soldering irons") have become the generally accepted norm due to their ability to maintain a safe, appropriate, user-selected tip operating temperature for the particular application at hand. Such traditional soldering stations generally consist of a power supply with a temperature control/display device, typically a dial or digital display which is powered by ordinary line power, and a soldering iron which is connected to the power supply by a power cord and is typically but not always a low voltage supply.

The soldering iron contains a handle and a closed-loop temperature controlled heater to which a replaceable soldering tip is attached through various means, examples of which include the products made by WELLER®, PACE® and HAKKO®. The traditional closed-loop temperature control means may consist of a thermocouple, resistive temperature detector (RTD) or other sensor embedded into the soldering iron heater, a closed-loop resistive control system such as that found in assignee's discontinued product known as the Micro Portable soldering/desoldering system, or other means.

Newer products which feature a combined tip/heater cartridge (for which the entire tip/heater cartridge is changed when the tip wears out) may utilize similar temperature control means or alternatively, may feature a Curie point control, such as the tip/heater cartridge product of METCAL INCORPORATED, or a combined heater/thermocouple arrangement such as that found in U.S. Pat. No. 5,043,560 (Masreliez) and in the Model 941 soldering station of the Hakko Corporation; see also, U.S. Pat. No. 4,839,501 of METCAL® and commonly owned, co-pending U.S. patent application Ser. No. 09/972,194. Compared with traditional soldering stations, tip/heater cartridge stations offer a slim, light weight often cooler handpiece which some operators prefer.

All of these soldering stations, however, suffer from the same or similar problems during use in that their temperature accuracy is less than what may be desired by the user, or that they require periodic calibration to confirm or re-establish compliance with defined performance standards which, among other things, typically include a defined level of temperature accuracy between the desired or selected operating tip temperature, and the true operating temperature (measured at equilibrium or "idle") as measured at the working end of the soldering tip by some other independent means as discussed above. One such standard for absolute temperature accuracy may be found in ANSI-J-STD-001B (and later revisions) in which "Operator selected or rated temperatures of soldering systems at idle/standby should be within +/−15° C. of actual measured tip temperature." Of course, users can and often do select different absolute temperature accuracy standards to suit their own particular needs. i.e., the displayed temperature and the actual temperature measured independently at the tip end with an embedded thermocouple must be within +/−15 degrees Centigrade (27 degrees F.) of each other. The conventional or traditional soldering iron systems of PACE® (the assignee of the present application) which employ RTD's provide even better absolute temperature accuracy of within +/−15° F. or better. The RTD itself (which is laser trimmed and consistent) offers a temperature accuracy within 1%, whereas a K type thermocouple (which is often the reference used for calibrating a soldering iron) may be accurate within +/−2.2 degrees Centigrade within a given temperature range (e.g., 0° C. to 277° C.).

These all would certainly represent acceptable levels of accuracy as well as relatively high degrees of accuracy when compared with existing tip/heater cartridge soldering systems whose true operating tip temperature (as measured at the working end of the tip) can vary by as much as 30° F. to 100° F. or more from the set, displayed or "rated" temperature of the tip.

In traditional soldering stations with removable tips, there are a number of reasons why the true operating tip temperature (as measured at the working end of the tip) varies from the user selected or desired tip temperature. The sensor measuring and controlling the heater output is typically located in the heater itself at some point away from the working end of the tip. Thus, it senses temperature changes at that point and only indirectly senses temperature and thermal load changes affecting the working end of the tip. Depending on the circuit configuration of the temperature control system, the relative masses of the heater and tip, the geometry of the tip and the working load on the tip during use, the true operating temperature of the tip (at idle) can vary as much as 50° F. or more from the user selected/displayed temperature on the dial or digital readout. This is particularly evident with large massive tips designed for surface mount component removal. This temperature difference becomes exacerbated when the user selected temperature is increased. It may also be affected when oxides build up between the tip and the heater which inhibits thermal conduction between the two.

Although it is less of an issue for certain types of soldering stations, such as those which use relatively accurate laser trimmed RTD's (Resistance Thermal Detectors), additional unknown sources of error between the user selected/displayed temperature and the true operating tip temperature are introduced when handpieces or heaters are changed, which occurs, respectively, when workshifts change (each shift operator often has his/her own handpiece) or when the heater burns out. This source of error is due to the wide variation in accuracy between sensors (such as thermocouples) from heater to heater. Furthermore, the temperature accuracy of even a single heater can "drift" over time, thus necessitating periodic calibration even if the handpiece, heater or tip/heater cartridge is not changed.

As suggested above, simply changing the tip in a soldering iron can introduce a significant source of inaccuracy between user selected/displayed temperature and the true operating tip temperature. Unless the system features a tip temperature offset feature which compensates for different tip geometries (such as the assignee's MBT 250 product) or the user knows how much error a particular tip will create (and can thus, in some way compensate for it), the user selected/displayed temperature and true operating tip temperature can vary greatly.

In the tip/heater cartridge type soldering stations, different tip geometries can also introduce similar errors. In addition, many of these tip/heater cartridges suffer from the same inaccuracies as traditional soldering iron heaters inasmuch as they employ thermocouples or other temperature regulation means which can greatly vary in accuracy from tip/heater cartridge to tip/heater cartridge. Thus, every time a tip/heater cartridge is changed, typically because the tip is worn or the user desires to use a different geometry of tip, a potentially significant unknown temperature error between the set, displayed, or rated temperature of the tip, and the true operating tip temperature is introduced in the soldering station. This is also the case with the Curie point control cartridges. Although tip/heater cartridge stations typically do not allow the user to select and/or display a particular desired tip temperature, the true operating tip temperature can vary greatly, even between two tip cartridges with the same tip geometry and temperature "range" or "rating". Furthermore, the temperature accuracy of even a single tip/heater cartridge can "drift" over time thus necessitating periodic calibration even if the cartridge is not changed.

It would be possible to employ more accurate temperature sensing devices, such as a separate RTD sensing circuit in the tip/heater cartridge, but this would be cost prohibitive.

Errors particularly large errors in absolute tip temperature accuracy can lead to serious problems in the electronic manufacturing, rework and repair process including loss of efficiency, poor quality work and damaged work.

To overcome these shortcomings, users or their organizations desire or require periodic calibration to confirm or re-establish performance standards which, among other things, include absolute temperature accuracy.

As mentioned above, even merely changing a heater, handpiece, tip/heater cartridge or a tip can cause an unacceptable error in absolute temperature accuracy thus necessitating calibration of a soldering station or the discontinuance of its use if it cannot be brought into conformance through calibration. Calibration can be accomplished through a variety of means, such as changing the position of a dial/display control relative to the potentiometer shaft or adjusting a separate "cal" potentiometer on the power source until the temperature measured by an independent temperature measurement means (of acceptable accuracy) attached to the working end of the installed tip matches the temperature set and/or displayed on the dial or digital readout on the power source. However, in many instances, the calibration procedure is reliable only for the particular set temperature at which it was performed. Once the user changes the set temperature, the desired or required level of absolute temperature accuracy may be lost since the magnitude of the temperature error varies with set temperature.

Soldering station calibration can be quite time consuming, requires the purchase of additional equipment and the training of personnel. It also reduces efficiency and adds cost to the electronic production process as it often necessitates the equipment to be taken out of service or off the production line during the calibration process.

A soldering apparatus processor having temperature selection, calibration and heating control is known from U.S. Pat. No. 5,495,093 (Griffith) has a stored program microcontroller by which one or more temperatures can be selected for a soldering iron tip, and then, the system automatically maintains the tip temperature during the soldering operation. A thermocouple is provided for measuring and calibrating the actual temperature of the iron tip, and an external thermocouple probe is used to separately and simultaneously ensure that the temperature of a probed component does not exceed a predetermined safe level. However, the calibration thermocouple is located on the soldering iron heater element just ahead of the heater end closest to the tip. As a result, tip scaling factors must be utilized to compensate for the temperature offsets at the tip and identification of the type of tip attached to the system.

SUMMARY OF THE INVENTION

It is therefore a primary object of the present invention to provide a soldering station with an accurate, quick, easy, low cost, convenient means of self-calibration which can be employed as frequently as desired any time a tip, heater, handpiece or tip/heater cartridge is changed, or routinely such as every time the soldering station is powered on, and which does not require re-calibration when the set or desired temperature is changed after the self-calibration procedure.

It is another primary object of the present invention to provide an economical, self-calibrating tip/heater cartridge soldering station which can provide an improved level of absolute temperature accuracy over those currently in use and known to the industry, even when the set or desired temperature is changed after the self-calibration procedure.

It is yet another primary object of the present invention to provide a self-calibrating soldering station which does not require an independent or separate calibration procedure utilizing other pieces of equipment.

Other features and advantages of the present invention will be apparent from a reading of specification and drawings.

In one preferred embodiment of the present invention, a contact type, calibration temperature sensor of a relatively high accuracy as compared to that of the temperature control system of a tip/heater cartridge is located in the soldering station power source. The contact sensor can be an RTD or other temperature sensing device of acceptable accuracy.

In set-up mode, the user can select whether the self-calibration warning feature is operable. When operable, an LED is illuminated in a red color if the tip/heater cartridge is removed or the handpiece is unplugged while the soldering station is powered on, or simply when the soldering station is powered "on" from the "off" mode. This is intended to alert the user that a self-calibration procedure may be required to ensure compliance of the unit with the desired performance standards.

The user sets the desired tip operating temperature appearing in the LED display using the up/down scroll keys, and with the desired geometry tip/heater cartridge installed in the handpiece, the tip is tinned with solder (to insure good thermal contact with the contact temperature sensor) and is then placed on the contact sensor. The system, through the contact temperature sensor, detects a temperature change and automatically initiates the self-calibration process. After a few seconds, when the temperature detected by the RTD (or other temperature sensing device) stabilizes, it enters into the tip/heater cartridge temperature control system, a temperature offset constant which compensates for any temperature discrepancy between the temperature as measured by the contact temperature sensor and the temperature being controlled by the tip/heater cartridge temperature control system, thus causing the system to achieve a much higher level of absolute temperature control accuracy (comparable to what the RTD would provide if it were in used in the tip/heater cartridge temperature control system). Now, the LED is illuminated in a green color (and/or with some message in the digital display) indicating that the self-calibration operation is completed.

Once the self-calibration process is completed for the installed tip/heater cartridge, the user can alter the desired temperature setting (using up/down scroll keys, a knob, dial, or other setting mechanism) at will without any loss of calibration since an algorithm built into the tip/heater cartridge temperature control system operates on the temperature offset constant causing the temperature compensation to be appropriately adjusted according to the set temperature. This is a non-linear function since the delta between the controlling temperature and the true tip temperature increases as the temperature increases. The use of such algorithms, per se, is known, see the Griffith patent and the PACE® MBT250 soldering station mentioned above.

In another preferred embodiment of the present invention, this same contact sensor can also be employed in a traditional soldering station of the types described above.

DETAILED DESCRIPTION OF THE INVENTION

Figure 1:
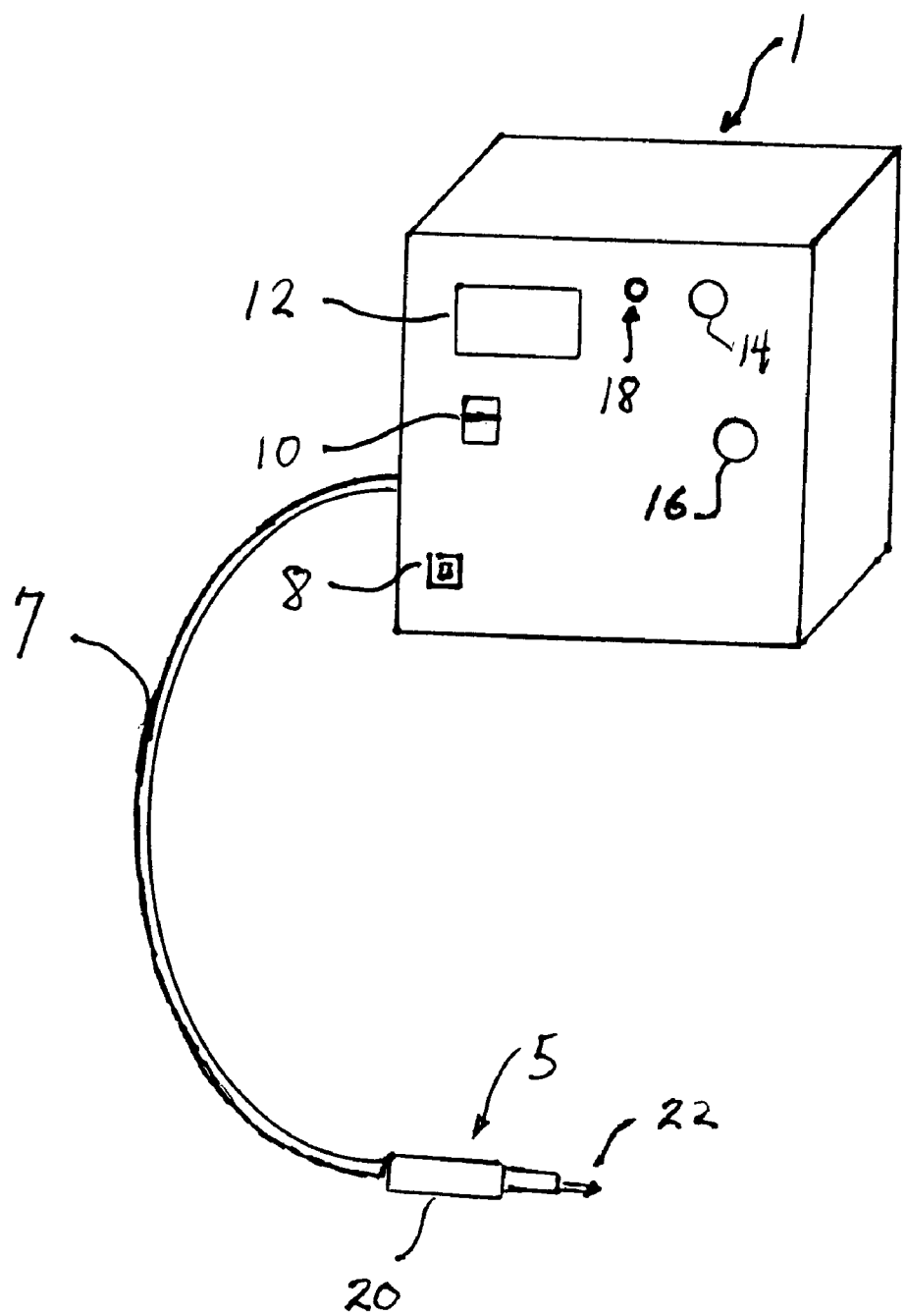
FIG. 1 is a schematic perspective view of soldering station in accordance with the present invention.

FIG. 1 schematically depicts a soldering station in accordance with the present invention. The soldering station is comprised of a control unit 1, and a soldering iron 5 that is connected to the control unit by a power cord 7. The control unit has an on/off switch 8, a temperature selector 10, a temperature display 12, a mode selector 14, a calibration status light 18 and a calibration temperature sensor 16. The soldering iron 5 has a handpiece 20 that is held by a user and a soldering tip 22 that can be a separate part that is attached to the handpiece 20 in heat conductive connection with a heater in the handpiece 20 or can be integrated with a heating element into a tip-heater cartridge which is replaceably mounted in the handpiece 20 of the soldering iron 5 as a unit, in manners known in the art and described above, the actual construction of the soldering iron 5, by itself, forming no part of this invention.

Figure 2:
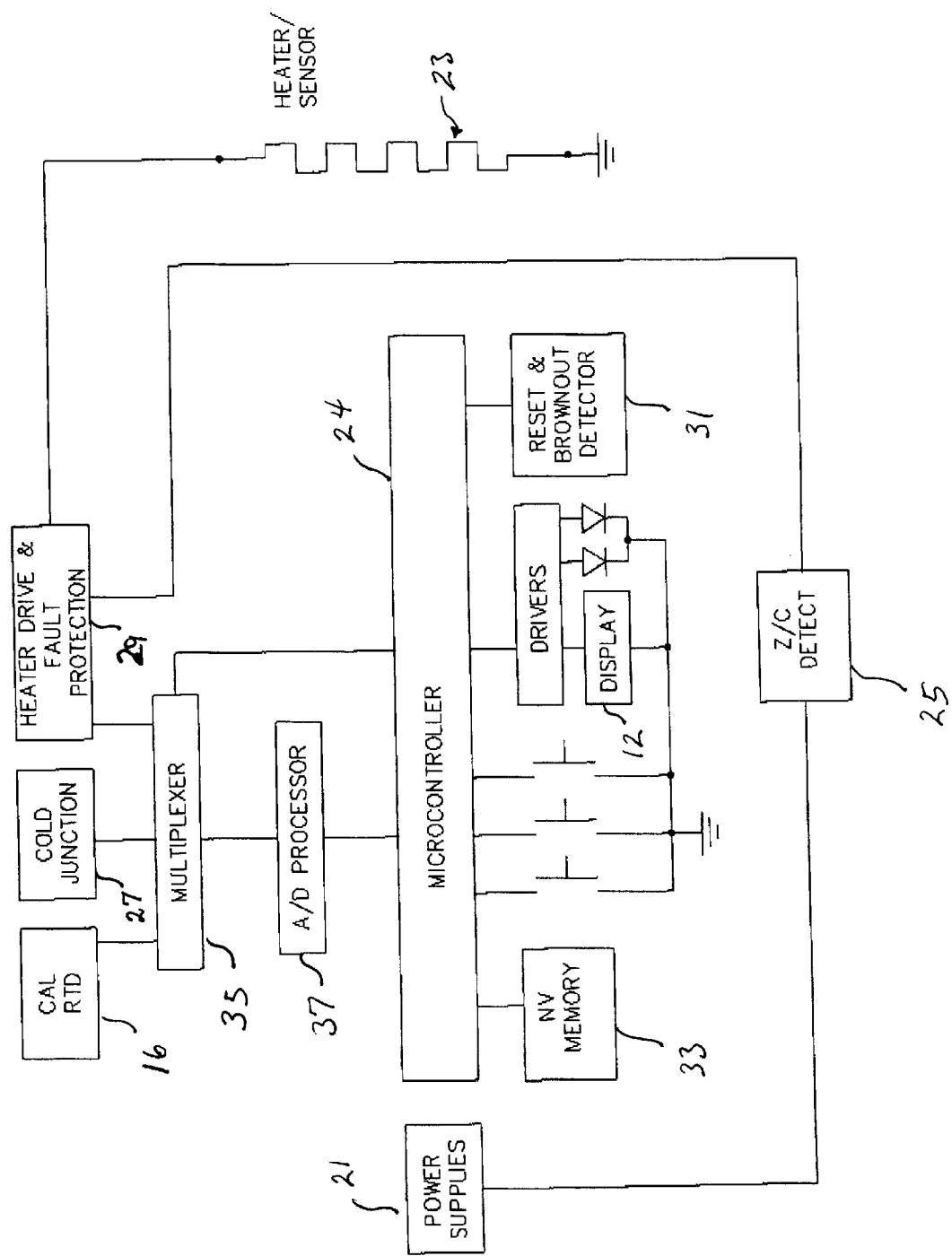
FIG. 2 is a block diagram of the principal components of the control arrangement of the soldering station.

With reference to the block diagram of FIG. 2, a power supply 21, which can be a low voltage AC power source such as a step-down transformer and a full-wave bridge rectifier, provides, e.g., 15 vdc, for heating the heater 23 of the soldering iron 5 and for generating additional on-board regulated voltage. In the case where the heater 23 comprises a heater Wire and a wire of a dissimilar metal, the heater also acts as a thermocouple. The power supplied to the heater to drive it to the set temperature is turned off at regular, short intervals, during which the thermal emf signal generated by the dissimilar metals and proportional to the temperature differential for their junction to the ends of attached cold leads is acquired, amplified and an analog-to-digital conversion performed, and cold junction compensation is used to calculate the actual tip temperature. Based on the temperature reported back, the microcontroller 24 adjusts the duty cycle of rectified, unregulated, unfiltered dc voltage to regulate the temperature at the tip to that set by the user. The temperature sensed by the heater thermocouple is shown on the display 12, which can be an LED display.

A zero crossing detector 25 comprises a comparator with a reference voltage and scaling resistors, and is used to detect zero voltage crossings of the bridge rectifier output. At each zero crossing, a pulse is generated by the comparator. The microcontroller issues a signal that turns the heater on or off depending on the then current duty cycle requirement. The heater thermal emf is measured by a differential amplifier when the heater is off and the measured thermal emf is added to a temperature value based on the temperature measured at cold junction 27 to determine actual heater temperature with the duty cycle being increased or decreased when the actual heater temperature is above or below the set temperature by a define amount. If an overcurrent condition is detected by a current sensing resistor in the heater drive and fault protection device 29, an interrupt is sent to the microcontroller which then turns off the heater drive.

It should be noted that the particular manner in which heat is supplied to the heater of the soldering iron or a tip and heater cartridge thereof is not an essential part of this invention. Thus, other conventional power supplying and controlling techniques can be substituted for the duty cycle control described above.

The microcontroller is reset at power up or in the event of a brownout by an external reset and brownout detector 31.

A non-volatile memory 33 is provided and is used to store user selected operating parameters, such minimum and maximum temperature settings, password lockout, ° F. or ° C. display, and additional set-up and calibration parameters.

The system utilizes three temperature sensors, the RTD of the calibration sensor 16, the thermocouple of the heater 23 and a thermistor (NTC) of the cold junction 27. Sensor measurements are taken under the direction of the microcontroller 24 which controls a multiplexer 35 which effectuates switching of the sensor to be read. Sensor measurement is preferably performed with a dual slope A/D processor 37 since it has the inherent ability to reject power line frequency noise.

Figure 3:
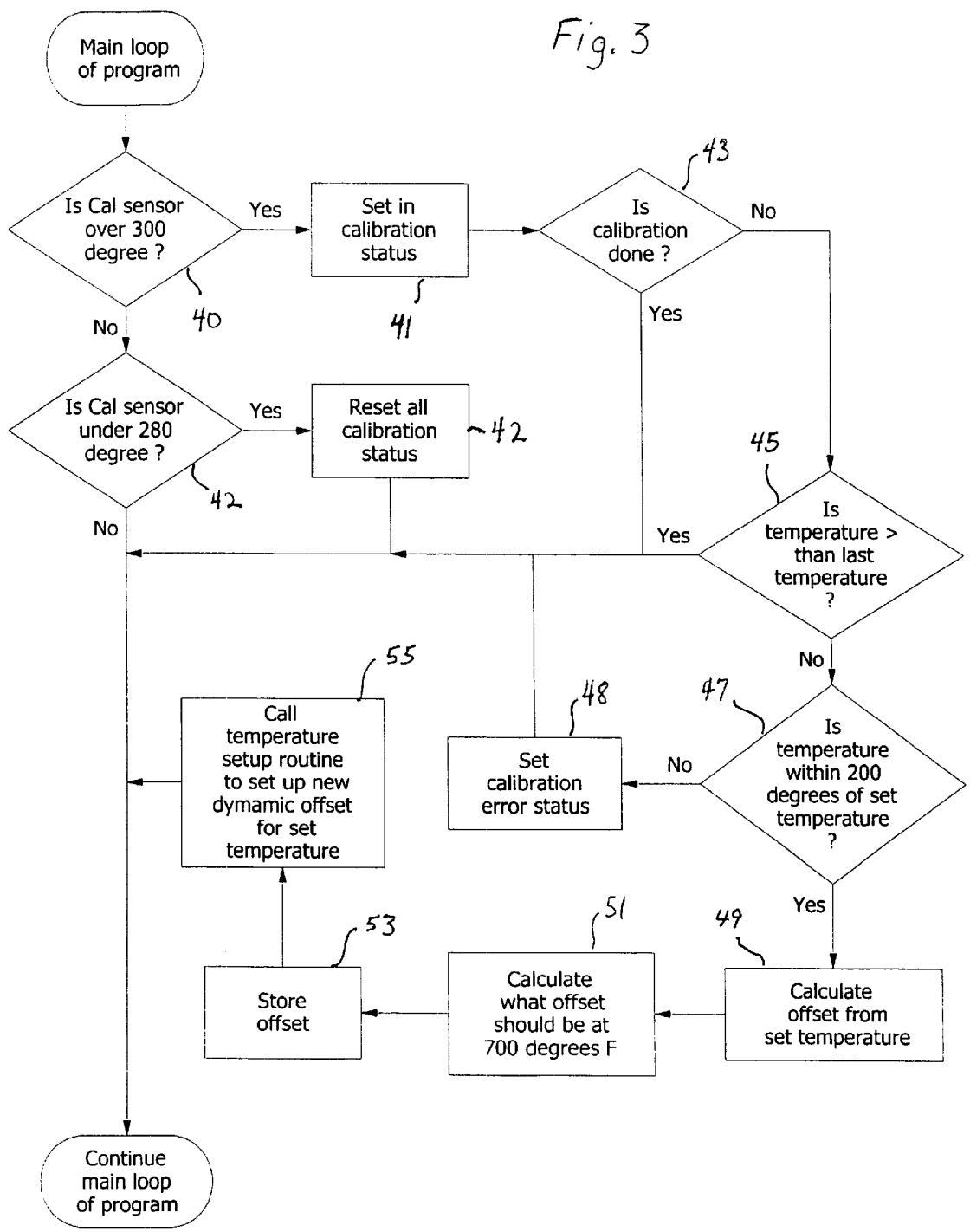
FIG. 3 is a flow chart of the operation of the control arrangement in accordance with a preferred embodiment of the invention.

System calibration will now be described with reference to the flow chart shown in FIG. 3. During operation, each time that the microcontroller scans the RTD of calibration sensor 16, a check is performed to determine if the RTD resistance corresponds to a temperature greater than 300° F. (block 40). If the resistance corresponds to a temperature greater than 300° F., then the system is set in calibration status 41, while if it is not, it is determined whether or not the RTD resistance corresponds to a temperature greater than 280° F. (step 42). If the resistance corresponds to a temperature that is greater than 280° F., no action is taken. On the other hand, if the resistance corresponds to a temperature that is below 280° F., all of the calibration values are reset in step 42 after which the main loop of the program continues.

Returning to block 41 and the operation once calibration status has been initiated a self-calibration routine is invoked, and after it has been determined that calibration has been achieved (yes to inquiry 45), the main loop of the program is resumed. During self-calibration, the microcontroller 24, via software, adjusts the heater duty cycle to achieve the set temperature. If scanning of the RTD indicates that the temperature sensed is no greater that than last temperature sensed, it is determined whether the temperature is within a predetermined number of degrees of the set temperature (200° F. in the example of step 47). If the sensed temperature is not within the predetermined number of degrees of the set temperature, calibration is terminated and calibration error status 48 is indicated and the main loop resumed.

If the sensed temperature is within the predetermined number of degrees of the set temperature, the microcontroller 24 routine 49 determines what the temperature offset is between the set temperature and the sensed temperature and then invokes a temperature setup routine 51 by which the microcontroller 24 calculates what the temperature offset should be at an elevated temperature, e.g., 700° F. (or some other temperature) and stores this value in memory 33 (block 53). This stored temperature offset is then used in the next step 55 to set a new dynamic offset for each new set temperature so that any change in the set temperature will automatically have the appropriate offset compensation value applied thereafter until such time as the calibration is reset.

While system calibration is being performed, it is desirable that the temperature display 12 reflect the calibration status instead of showing the temperature set. For example, the display could show the letters "CAL" when the temperature sensed by the RTD is rising, "CC" from the time that calibration is completed until the RTD temperature falls below 280° F., and "CEE" from when error status is set until the RTD temperature falls below 280° F. After calibration has been completed and the system returned to the normal operating mode, the display would revert to showing the temperature set.

The calibration status light 18 is preferably a bi-color LED, e.g., red-green and provides a warning when the system is no longer properly calibrated. In set-up mode, the user can select whether the self-calibration warning feature is operable, e.g., using mode selector switch 14 in set up. When operable, the LED is illuminated in a red color if the tip/heater cartridge is removed or the handpiece is unplugged while the soldering station is powered on, or simply when the soldering station is powered "on" from the "off" mode. This is intended to alert the user that a self-calibration procedure may be required to ensure compliance of the unit with the desired performance standards. If the self-calibration warning feature is not operable, the LED will illuminate green even though the tip/heater cartridge is removed or the handpiece is unplugged while the soldering station is powered on, or simply when the soldering station is powered "on" from the "off" mode. However, even in this mode, the system will automatically go into calibration mode at any time by applying the heated tip to the calibration temperature sensor.

In normal use of the system, the user sets the desired tip operating temperature appearing in the temperature display 12 using an up/down rocker switch 18 or a plurality of up/down scroll keys, e.g., one for each temperature decimal place. With the desired geometry tip or tip and heater cartridge installed in the handpiece 20, the tip 22 is tinned with solder (to insure good thermal contact with the calibration temperature sensor 16) and is then placed on the sensor 16. The system, through the contact calibration temperature sensor 16, detects a temperature change and automatically initiates the self-calibration process described above. After a few seconds, when the temperature detected by the RTD (or other temperature sensing device) stabilizes, it enters into the temperature control system, a temperature offset constant which compensates for any temperature discrepancy between the temperature as measured by the contact temperature sensor and the temperature being controlled by the tip/heater cartridge temperature control system, thus causing the system to achieve a much higher level of absolute temperature control accuracy (comparable to what an RTD would provide if it were in use in the tip/heater cartridge temperature control system). Now, the LED 18 is illuminated in a green color, and/or a message is illuminated on the display 12 before it reverts to showing the temperature set, thereby indicating that the self-calibration operation has completed.

Once the self-calibration process is completed for the installed tip/heater cartridge, the user can alter the desired temperature setting (using up/down scroll keys, a knob, dial, or other setting mechanism) at will without any loss of calibration since the nonlinear temperature offset adjustment algorithm built into the tip/heater cartridge temperature control system operates, as noted above, on the temperature offset constant so as to cause the temperature compensation to be appropriately adjusted according the set temperature.

While not part of the system of the preferred embodiment described above, it is noted that, as is known, the system could be provided with a plurality of stored temperature offset constants, each of which is used for a particular type or size/mass tip, and a selector or chart would be provided to enable the user to manually identify and select or enter into the system the appropriate offset constant for the particular type or size/mass tip. In this way, the algorithm would use a particular tip constant for the particular tip in use instead of a "generic" constant, thereby increasing the degree to which calibration is accurately maintained despite even large adjustments in the set temperature.

From the foregoing, it should now be apparent how the soldering station of the present invention is provided with an accurate, quick, easy, low cost, and convenient means of self-calibration which can be employed as frequently as desired any time a tip, heater, handpiece or tip and heater cartridge is changed, or routinely, such as every time the soldering station is powered on. Furthermore, it can be seen that the applicants' self-calibrating soldering station provides an improved level of absolute temperature accuracy over those currently in use and known to the industry, even when the set or desired temperature is changed after the self-calibration procedure, and that calibration is performed without the need for an independent or separate calibration procedure utilizing other pieces of equipment.

What is claimed is:

1. A soldering station comprising:
   control unit; and
   a soldering iron having a replaceable soldering tip, said soldering iron being connected to the control unit by a power cord for receiving electrical power from said control unit;
   wherein the control unit comprises a housing containing circuitry for controlling the temperature of the soldering iron at said tip by adjusting a supply of power to a tip heater of said soldering iron, a temperature selector for enabling selection of a temperature to which the soldering iron is to be heated by a user, a calibration temperature sensor connected to said circuitry and exposed for enabling engagement of the tip of the soldering iron therewith;
   wherein said circuitry has a calibration mode and a heating mode; wherein, in said calibration mode, said circuitry is adapted to compare a temperature sensed by the calibration temperature sensor and produced by contacting of the soldering iron which has been heated to a temperature selected with said temperature selector with the calibration temperature sensor and for adjusting the power supply to the tip heater so as to bring the temperature sensed by the calibration temperature sensor into conformance with the temperature selected with the temperature selector.

2. Soldering station according to claim 1, wherein said tip and tip heater are integrated into a tip and heater cartridge which is replaceably mounted in a handpiece of the soldering iron as a unit.

3. Soldering station according to claim 2, wherein said circuitry is adapted to trigger a calibration indicator whenever the cartridge is removed while the soldering station is powered on, said calibration indicator providing notice of a possible need for calibration.

4. Soldering station according to claim 1, wherein said circuitry is adapted to trigger a calibration indicator whenever the handpiece is unplugged from the control unit while the soldering station is powered on, said calibration indicator providing notice of a possible need for calibration.

5. Soldering station according to claim 1, wherein said circuitry is adapted to trigger said calibration mode whenever said calibration temperature sensor detects a temperature of at least approximately 300° F.

6. Soldering station according to claim 1, wherein said circuitry is adapted to trigger a calibration indicator upon turning on of said control unit, said calibration indicator providing notice of a possible need for calibration.

7. Soldering station according to claim 1, further comprising an indicator for indicating whether or not calibration needs to be performed.

8. Soldering station according to claim 1, wherein the calibration temperature sensor is a Resistance Thermal Detector.

9. Soldering station according to claim 1, wherein said soldering iron has a temperature sensor therein which has a temperature accuracy relative to the actual temperature at the tip of the soldering iron which varies by at least as much as 30° F. from a temperature set by the temperature selector, and wherein said calibration brings said temperature accuracy to within approximately plus or minus 15° F.

10. Soldering station according to claim 2, wherein the calibration temperature sensor is a thermocouple.

11. Soldering station according to claim 1, wherein the calibration temperature sensor is a thermocouple.

* * * * *